(12) United States Patent
Patel

(10) Patent No.: US 10,334,991 B1
(45) Date of Patent: Jul. 2, 2019

(54) COMBINATION CUTTING AND STRAINING APPARATUS

(71) Applicant: Ashok Patel, Central Valley, NY (US)

(72) Inventor: Ashok Patel, Central Valley, NY (US)

( * ) Notice: Subject to any disclaimer, the term of this patent is extended or adjusted under 35 U.S.C. 154(b) by 0 days.

(21) Appl. No.: 16/167,740

(22) Filed: Oct. 23, 2018

(51) Int. Cl.
*B25B 11/00* (2006.01)
*A47J 47/00* (2006.01)
*A47J 43/24* (2006.01)
*A47J 47/16* (2006.01)

(52) U.S. Cl.
CPC ............. *A47J 47/005* (2013.01); *A47J 43/24* (2013.01); *A47J 47/16* (2013.01)

(58) Field of Classification Search
CPC ........... B25B 11/00; B25B 11/02; A47J 43/14
See application file for complete search history.

(56) References Cited

U.S. PATENT DOCUMENTS

| | | | | |
|---|---|---|---|---|
| 5,706,721 A * | 1/1998 | Homes | .................... | A47J 36/08 100/110 |
| 6,129,344 A | 10/2000 | Yang | | |
| 7,252,255 B2 * | 8/2007 | Cornfield | .............. | A47J 47/005 241/274 |
| 8,757,602 B2 * | 6/2014 | Bagley | .................. | A47J 47/005 210/232 |
| 9,060,642 B1 * | 6/2015 | Armbrust | ................ | A47J 36/20 |
| 2012/0147693 A1 * | 6/2012 | Bahlenhorst | ............ | A47J 43/25 366/130 |
| 2013/0241127 A1 | 9/2013 | Yang | | |

FOREIGN PATENT DOCUMENTS

KR 101311770 B1 9/2013

\* cited by examiner

*Primary Examiner* — Lee D Wilson
(74) *Attorney, Agent, or Firm* — Dale J. Ream

(57) ABSTRACT

A combination cutting and straining apparatus includes a cutting board that includes a planar configuration having opposed top and bottom surfaces, the cutting board having opposed front and rear edges and having first and second side edges extending between ends of the front and rear edges, respectively. The bottom surface of the cutting board defines first and second grooves that are proximate to and extend parallel to the first and second side edges, respectively, and extend between the front and rear edges, respectively. A strainer basket includes a bottom wall and a plurality of walls extending upwardly from peripheral edges of the bottom wall, respectively, for collectively defining an interior straining area. Side walls of the strainer basket include upper edges received in respective grooves for slidable movement of the cutting board atop the strainer basket. Cutting board legs are pivotally coupled to a bottom surface of the cutting board.

18 Claims, 6 Drawing Sheets

US 10,334,991 B1

COMBINATION CUTTING AND STRAINING APPARATUS

BACKGROUND OF THE INVENTION

This invention relates generally to food processing devices and, more particularly, to a combined cutting and straining apparatus.

Food preparation often involves the cutting or chopping of vegetables and meat and then rinsing or straining the cut food items before mixing the rinsed food items or otherwise continuing to prepare a meal. Items cut using a cutting board are often deposited into a separate straining basket and the process is repeated until the straining basket is full or the food items are completely chopped. In other words, the cutting board may not be large enough to contain all of the food items at one time and may result in spillage onto a counter or floor.

Various devices have been proposed for combining the features of a cutting board with a strainer basket. Although presumably effective for their intended purposes, the existing device or proposals do not have a structure to maximize the stability or efficiency of the combination.

Therefore it would be desirable to have a cutting board coupled to a strainer basket and configured such that cut food items may be scraped or pushed directly into the strainer basket until the strainer basket is full and ready for rinsing. Further, it would be desirable to have a combined cutting board and strainer basket in which the cutting board is wider than the strainer basket and includes a plurality of cutting board legs that may be selectively deployed for enhanced support and stability during straining.

SUMMARY OF THE INVENTION

A combination cutting and straining apparatus according to the present invention includes a cutting board that includes a planar configuration having a top surface and a bottom surface opposite the top surface, the cutting board having a front edge and a rear edge opposite the front edge and having first and second side edges extending between ends of the front and rear edges, respectively. The bottom surface of the cutting board defines first and second grooves that are proximate to and extend parallel to the first and second side edges, respectively, and extend between the front edge and the rear edge, respectively. A strainer basket includes a bottom wall and a plurality of walls extending upwardly from peripheral edges of the bottom wall, respectively, for collectively defining an interior straining area. Side walls of the strainer basket include upper edges received in respective grooves for slidable movement of the cutting board atop the strainer basket.

Therefore, a general object of this invention is to provide a combination cutting and straining apparatus for facilitating the chopping of food items and then depositing the chopped items into a strainer basket coupled to the cutting board.

Another object of this invention is to provide a combination cutting and straining apparatus, as aforesaid, in which a cutting board is coupled to a straining basket and slidably movable between open and closed configuration.

Still another object of this invention is to provide a combination cutting and straining apparatus, as aforesaid, in which the cutting board includes a plurality of support legs that may be deployed even while the cutting board is coupled to the strainer basket.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 5b is an isolated view on an enlarged scale taken from FIG. 5a.

DESCRIPTION OF THE PREFERRED EMBODIMENT

Figure 1:
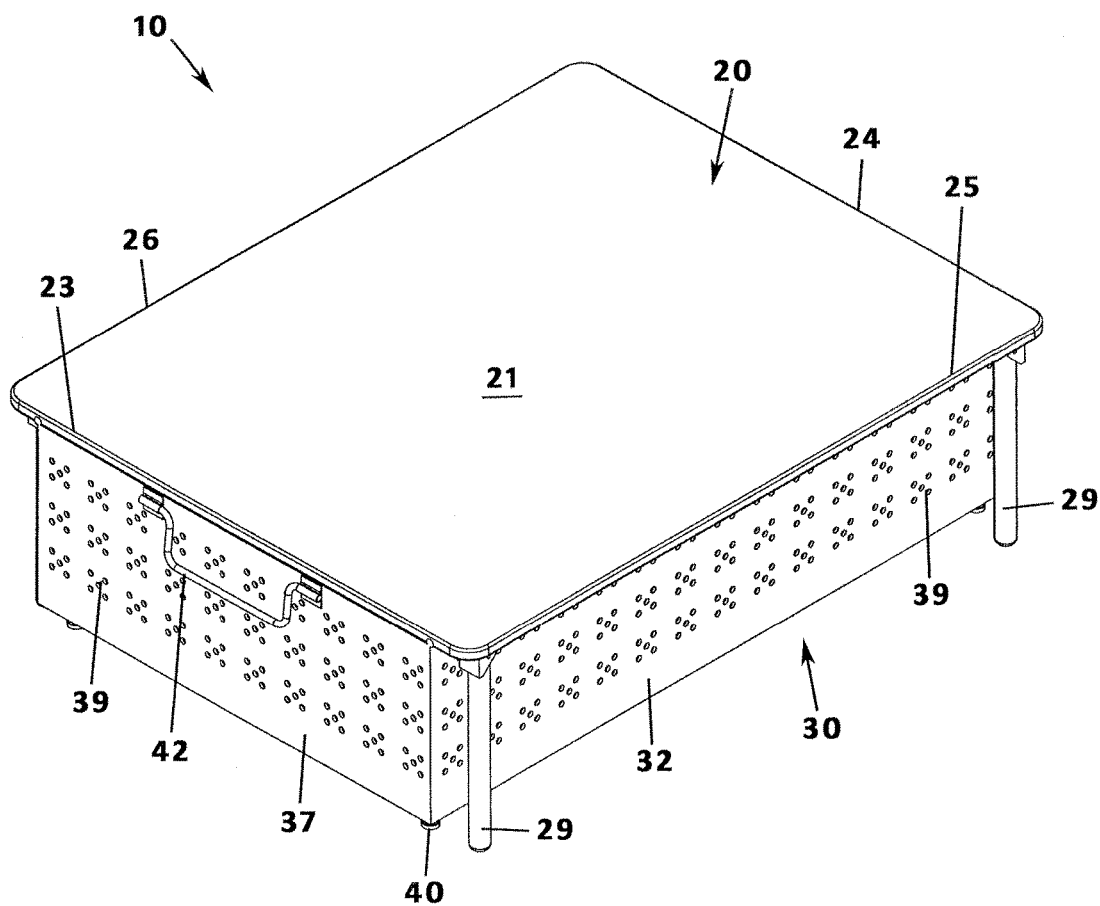
FIG. 1 is a perspective view of a combination cutting and straining apparatus according to a preferred embodiment of the present invention, illustrated with a cutting board in a completely closed configuration.
Figure 2:
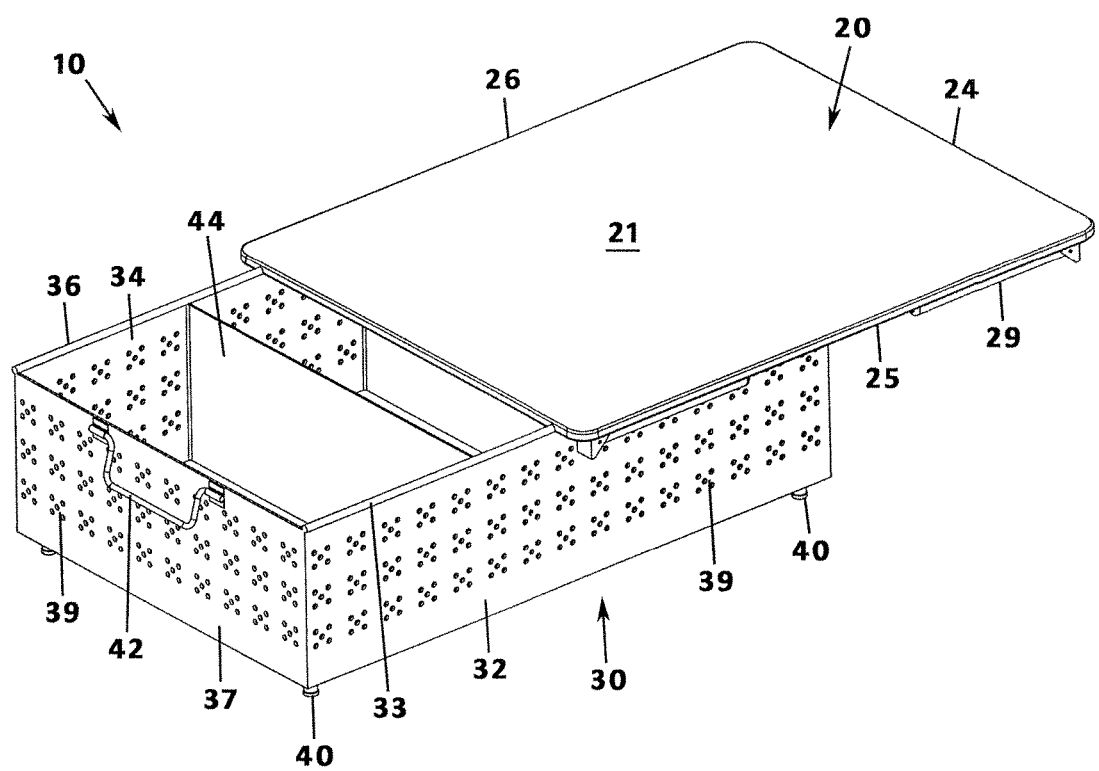
FIG. 2 is another perspective view of the combination cutting and straining apparatus as in FIG. 1, illustrated with the cutting board in a partially open configuration.

A combination cutting and straining apparatus according to a preferred embodiment of the present invention will now be described with reference to FIGS. 1 to 5b of the accompanying drawings. The combination cutting and straining apparatus 10 includes a cutting board 20 and a strainer basket 30 configured for slidable attachment to the cutting board 20 so that food items cut upon the cutting board 20 may be transferred to the strainer basket 30 more efficiently, i.e. by merely sliding the food items into the strainer basket 30 while still attached thereto.

The cutting board 20 of the present invention is illustrated as having a generally rectangular and flat configuration and such a configuration as is deemed most likely for convenient use and that is preferred although other configurations of shape and dimension may also work. More particularly, the cutting board 20 has a planar or flat configuration having a top surface 21 and a bottom surface 22 opposite the top surface 21, the cutting board 20 having a thin profile constructed of a plastic material having a high durometer hardness, such as polyethylene or high density polyethylene.

The cutting board 20 has a plurality of side edges that separate the upper surface from the bottom surface 22 and which define the shape configuration. More particularly, the cutting board 20 includes a front edge 23 which may also be referred to as a leading edge and includes a rear edge 24 that is opposite and parallel to front edge 23 and which may also be referred to as the trailing edge. A first side edge 25 and a second side edge 26 opposite and parallel to the first side edge 25 extend between respective ends of the front edge 23 and rear edge 24 of the cutting board 20. Together, the cutting board 20 has a generally rectangular configuration upon which vegetables, meat, or other food items may be cut into pieces in advance of being rinsed in the strainer basket 30 as will be described later.

Figure 5A:
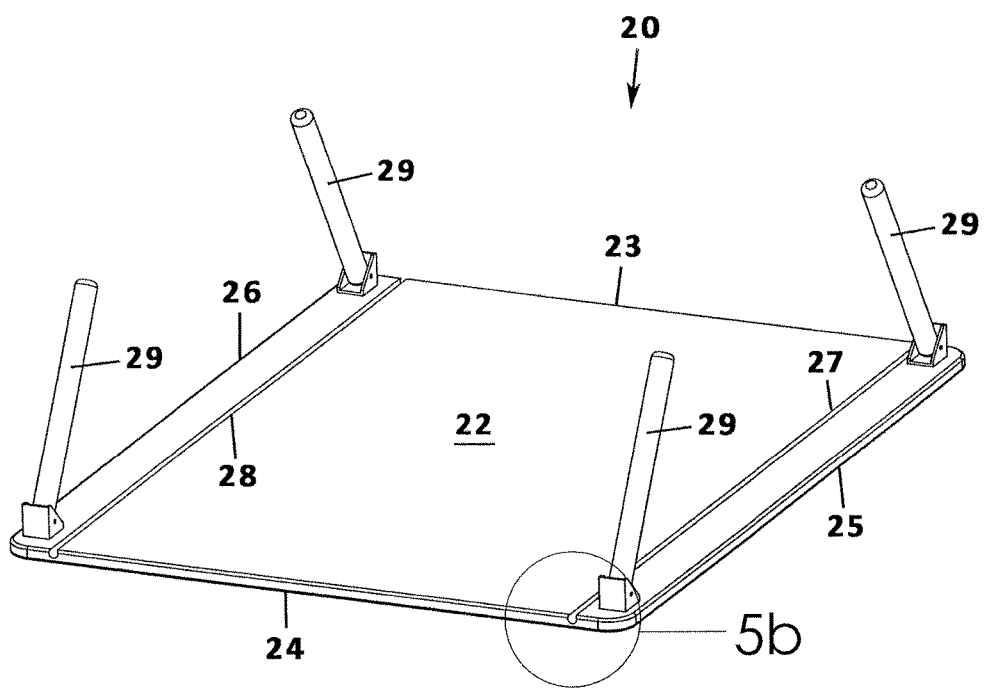
FIG. 5a is another perspective view of the bottom side of the cutting board as in FIG. 4, illustrated with the plurality of strainer leg members in deployed configurations.
Figure 5B:
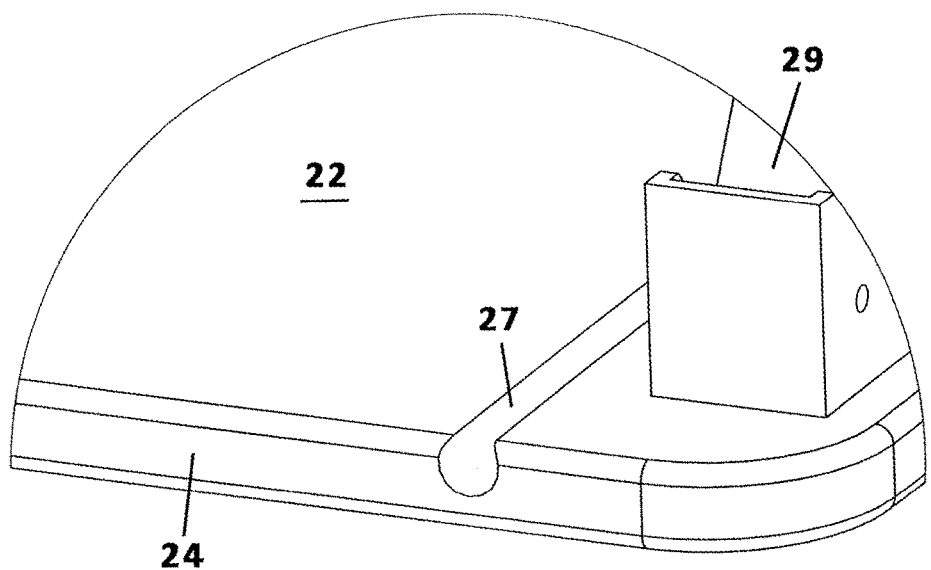

The bottom surface 22 of the cutting board 20 may include a pair of spaced apart grooves that enable the cutting board 20 to be slidably coupled to the strainer basket 30. More particularly, the bottom surface 22 may define a first groove 27 that extends completely or substantially between the front edge 23 and the rear edge 24 of the cutting board 20, each groove having a linear configuration and defining a channel for slidable movement. In an embodiment, the first groove 27 is offset and displaced inwardly from the first side edge 25 of the cutting board 20 (FIG. 5a). Likewise, the second groove 28 is offset and displaced inwardly from the second side edge 26 of the cutting board 20. Preferably, both grooves are proximate the side edges, respectively. However, it is also contemplated respective grooves are situated immediately adjacent respective side edges (and not offset or displaced therefrom).

Figure 4:
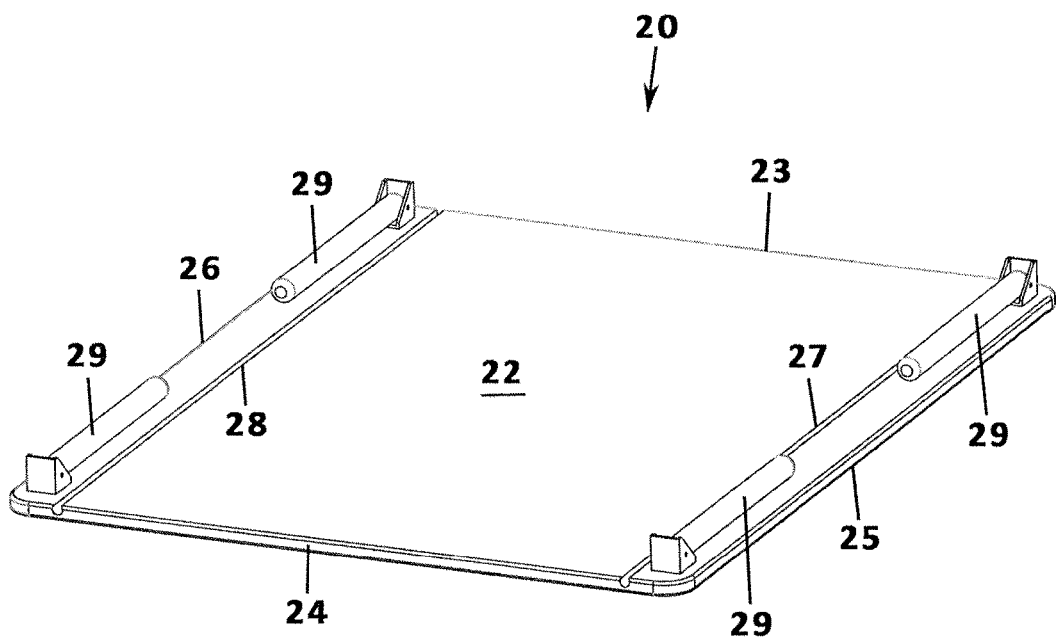
FIG. 4 is a perspective view of a bottom side of the cutting board according to the present invention, illustrated with a plurality of strainer leg members in retracted configurations.

Preferably, the cutting board 20 has a width that is greater than a width of the strainer basket 30. More particularly, the distance between the first side edge 25 and second side edge 26 of the cutting board 20 is greater than a distance between first side wall 32 and second side wall 34 of the strainer basket 30. While the grooves line up and mate with upper edges of the side walls of the strainer basket 30, the first and second side edges 25, 26 of the cutting board 20 extend outwardly beyond respective grooves and, as a result, form a ledge and a space in which a plurality of cutting board legs 29 are positioned as shown in FIGS. 4 and 5a.

The plurality of cutting board legs 29 are pivotally coupled to the bottom surface 22 of the cutting board 20 and spaced apart from each other, such as being positioned in each corner. Each cutting board leg 29 is pivotally coupled to the bottom surface 22 and pivotally movable between a retracted configuration that is parallel and adjacent to the bottom surface 22 (FIG. 4) and a deployed configuration that is perpendicular to and extending away from the bottom surface 22 (FIG. 5a). Further, each cutting board leg 29 is longer than a height of the walls of the strainer basket 30. Because the cutting board 20 is wider than the strainer basket 30, because each cutting board leg 29 is positioned between a respective groove 27, 28 and a respective side edge 25, 26, and because each cutting board leg 29 is longer than a height of the strainer basket 30, each leg 29 is positioned to the exterior of a respective first side wall 32 and second side wall 34 of the strainer basket 30 as shown in FIG. 1.

Figure 3:
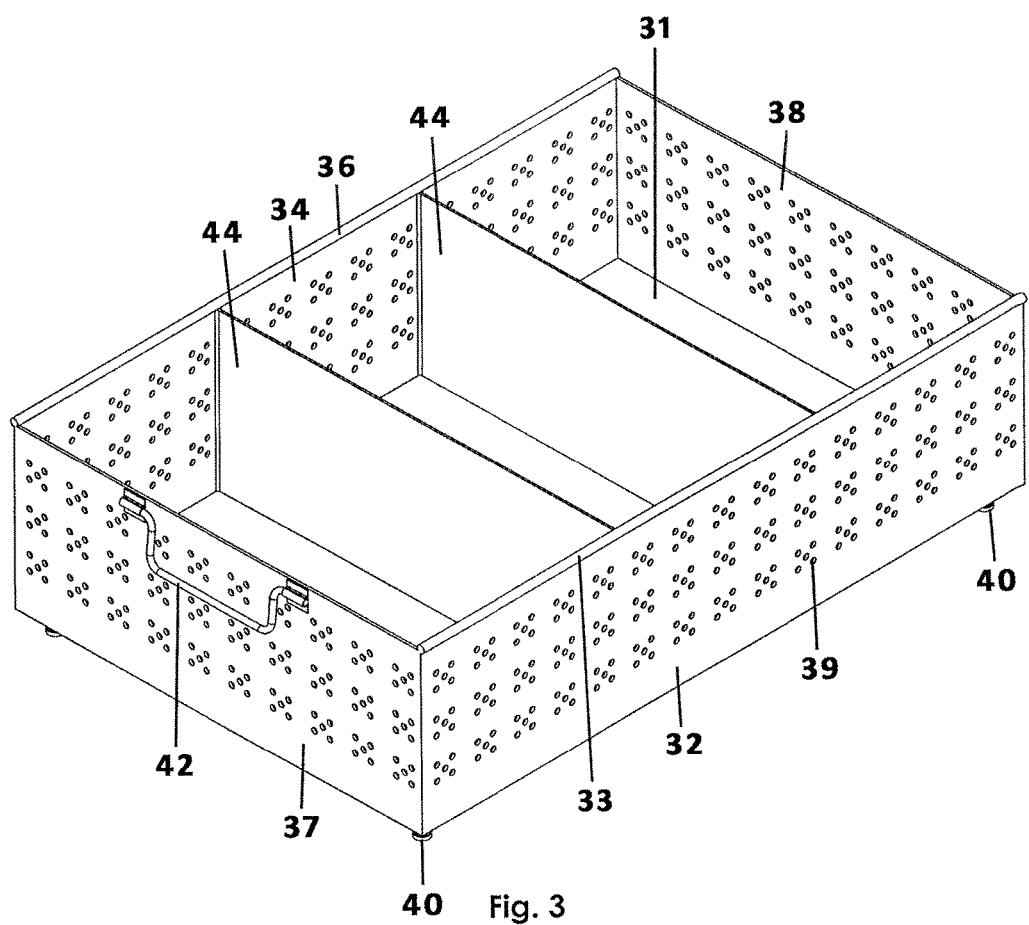
FIG. 3 is another perspective view of the combination cutting and straining apparatus as in FIG. 1, illustrated with the cutting board completely removed.

The combination cutting and straining apparatus 10 includes the strainer basket 30. The strainer basket 30 includes a bottom wall 31 and a plurality of upstanding walls extending upwardly from peripheral edges of the bottom wall 31 so as to define an interior straining space. The top remains open (FIG. 3). The strainer basket 30 may include one or multiple partitions 44 spaced apart from one another and any other wall so as to divide the strainer space into multiple strainer spaces or compartments. This construction is useful to keep various food items separated from one another. The plurality of upstanding walls may include a first side wall 32 extending upwardly and having a first upper edge 33 and may include a second side wall 34 extending upwardly and having a second upper edge 36. The first and second side walls are opposite and parallel to one another. The plurality of upstanding walls may also a front wall 37 and opposite rear wall 38 extending between respective ends of the first and second side walls. It will be understood that the dimensions of the first groove 27 and second groove 28 are complementary to the configuration of the first upper edge 33 and second upper edge 36 so that respective upper edges are received in respective grooves for slidable movement of the cutting board 20 relative to the strainer basket 30. The strainer basket 30 may include a plurality of feet 40, such as rubber tabs or stainless steel, coupled to the bottom wall 31 to provide enhanced support or grip on a countertop or in a sink.

The bottom wall 31 of the strainer basket 30 is constructed of an impermeable material such as plastic having a thickness sufficient to resist puncture and to maintain the form of the strainer basket. By contrast, each of the upstanding walls of the strainer basket 30 may be fully or partially permeable, i.e. allow water to pass through. Specifically, each wall may define a plurality of holes 39 or perforations. Each hole 39 has a size that allows water, such as from a kitchen faucet, to pass through while restraining the food items themselves, e.g. vegetable pieces or chunks of cut meat.

In another aspect, a handle member 42 may be coupled to each of the front wall 37 and rear wall 38 of the strainer basket 30. Each handle member 42 may include a rod, a latch, a tab, an inset or recess, or other flange that enables a user to lift the entire apparatus from a storage position in a cabinet, from a sink, or the like. Additional handle members (not shown) may be included as well so as to enhance a user's ability to lift and move the apparatus.

In another aspect and in a manner substantially similar to how the cutting board 20 is slidably coupled to the strainer basket 30, the chopping board 20 may be slidably coupled to a trash receptacle (not shown) so that scraps of food items can be discarded quickly and efficiently.

In use, the cutting board 20 may be coupled to the strainer basket 30 for use. Specifically, the upper edges of the first and second edges of the first and second walls of the strainer basket 30 are engaged or pressed into the first and second grooves of the cutting board 20 as described above. Food items such as fruits, vegetables, and chunks of meat may be cut and processed atop the top surface 21 of the cutting board 20 until ready to be rinsed in water. Then, the cutting board 20 may be moved slidably (front end first) to a partially deployed or open configuration revealing the interior straining area of the strainer basket 30. The processed food items may then be scraped or otherwise directed to fall by gravity into the interior straining area. The cutting board legs 29 may be deployed for additional stability and support. Positioned in a sink, water from the faucet may be directed into the strainer basket 30 so as to rinse or strain the contents therein and the water is allowed to exit through the holes 39 as described. Once strained, the contents of the interior straining area may be dumped onto a plate or, alternatively, the cutting board 20 may be slidably removed from the strainer basket 30 so that the strained food items may be dumped again onto the top surface 2 of the cutting board 20.

It is understood that while certain forms of this invention have been illustrated and described, it is not limited thereto except insofar as such limitations are included in the following claims and allowable functional equivalents thereof.

The invention claimed is:

1. A combination cutting and straining apparatus, comprising:
   a cutting board having a top surface and a bottom surface opposite said top surface and having a planar configuration, said cutting board having first and second side edges;
   wherein said bottom surface of said cutting board defines first and second grooves that are proximate and extending parallel to said first and second side edges, respectively;
   a strainer basket having a bottom wall that is impermeable and a plurality of walls extending upwardly from peripheral edges of said bottom wall, respectively, for defining an interior straining area, each wall of said plurality of walls being permeable and defining a plurality of holes operable for water to pass through;

wherein said plurality of walls includes first and second side walls having first and second upper edges, respectively, that are selectively received in said first and second grooves, respectively, and operable for slidable movement of said cutting board atop said strainer basket.

2. The combination cutting and straining apparatus as in claim 1, wherein said first and second grooves are offset inwardly from said first and second side edges, respectively.

3. The combination cutting and straining apparatus as in claim 2, wherein said cutting board has a width between said first and second side edges that is greater than a width between said first and second side walls of said strainer basket, respectively.

4. The combination cutting and straining apparatus as in claim 3, further comprising a plurality of cutting board legs pivotally coupled to said bottom surface of said cutting board, each respective cutting board leg being pivotally movable between a retracted configuration parallel and adjacent to said bottom surface of said cutting board and a deployed configuration perpendicular to and extending away from said bottom surface of said cutting board.

5. The combination cutting and straining apparatus as in claim 4, wherein a respective cutting board leg is positioned between said first groove and said first side edge or positioned between said second groove and said second side edge, respectively, so that said plurality of cutting board legs are positioned to an exterior of said side walls of said strainer basket, respectively.

6. The combination cutting and straining apparatus as in claim 1, further comprising a plurality of cutting board legs pivotally coupled to said bottom surface of said cutting board, each respective cutting board leg being pivotally movable between a retracted configuration parallel and adjacent to said bottom surface of said cutting board and a deployed configuration perpendicular to and extending away from said bottom surface of said cutting board.

7. The combination cutting and straining apparatus as in claim 6, wherein:
each cutting board leg has a length that is longer than a length between said bottom wall and said first upper edge of said first side wall of said strainer basket; and
each cutting board leg has a length that is longer than a length between said bottom wall and said second upper edge of said second side wall of said strainer basket.

8. The combination cutting and straining apparatus as in claim 1, further comprising at least one partition wall extending upwardly from said bottom wall of said strainer basket for dividing said interior straining area into multiple interior straining areas.

9. The combination cutting and straining apparatus as in claim 1, further comprising a pair of handle members coupled to opposed front and rear walls of said plurality of walls of said strainer basket.

10. A combination cutting and straining apparatus, comprising:
a cutting board that includes a planar configuration having a top surface and a bottom surface opposite said top surface, said cutting board having a front edge and a rear edge opposite said front edge and having first and second side edges extending between ends of said front and rear edges, respectively;
wherein said bottom surface of said cutting board defines a first groove and a second groove that are proximate and extend parallel to said first side edge and said second side edge, respectively, and extend between said front edge and said rear edge, respectively;

a strainer basket having a bottom wall and a plurality of walls extending upwardly from peripheral edges of said bottom wall, respectively, for collectively defining an interior straining area, each wall of said plurality of walls defining a plurality of holes operable for water to pass through;
wherein said plurality of walls includes a first side wall having a first upper edge and includes a second side wall having a second upper edge, said first upper edge and said second upper edge being selectively received in said first groove and said second groove, respectively, and operable for slidable movement of said cutting board atop said strainer basket;
a plurality of cutting board legs pivotally coupled to said bottom surface of said cutting board, each respective cutting board leg being pivotally movable between a retracted configuration parallel and adjacent to said bottom surface of said cutting board and a deployed configuration perpendicular to and extending away from said bottom surface of said cutting board.

11. The combination cutting and straining apparatus as in claim 10, wherein said plurality of walls of said strainer basket include a front wall and a rear wall opposite said front wall extending between ends of said pair of side walls, respectively, said strainer basket including a pair of handle members coupled to exterior surfaces of said front wall and said rear wall, respectively.

12. The combination cutting and straining apparatus as in claim 10,
wherein said first groove and said second groove are offset inwardly from said first side edge and from said second side edge, respectively.

13. The combination cutting and straining apparatus as in claim 12, wherein said cutting board defines a width dimension between said first side edge and said second side edge that is greater than a width dimension between said first side wall and said second side wall of said strainer basket, respectively.

14. The combination cutting and straining apparatus as in claim 13, further comprising a plurality of cutting board legs pivotally coupled to said bottom surface of said cutting board, each respective cutting board leg being pivotally movable between a retracted configuration parallel and adjacent to said bottom surface of said cutting board and a deployed configuration perpendicular to and extending away from said bottom surface of said cutting board.

15. The combination cutting and straining apparatus as in claim 14, wherein a respective cutting board leg is positioned between said first groove and said first side edge and positioned between said second groove and said second side edge, respectively, so that said plurality of cutting board legs are positioned to an exterior of said side walls of said strainer basket, respectively.

16. The combination cutting and straining apparatus as in claim 10, wherein:
each cutting board leg has a length that is longer than a length between said bottom wall and said first upper edge of said first side wall of said strainer basket; and
each cutting board leg has a length that is longer than a length between said bottom wall and said second upper edge of said second side wall of said strainer basket.

17. The combination cutting and straining apparatus as in claim 10, wherein:
said bottom wall of said strainer basket is impermeable; and
said plurality of walls of said strainer basket are permeable, each side wall defining a plurality of holes.

18. The combination cutting and straining apparatus as in claim 10, further comprising at least one partition wall extending upwardly from said bottom wall of said strainer basket and being displaced from front wall and said rear wall for dividing said interior straining area into multiple interior straining areas.

* * * * *